March 31, 1942. A. G. HEGGEM 2,277,975
VALVE
Filed Jan. 31, 1941 3 Sheets-Sheet 3
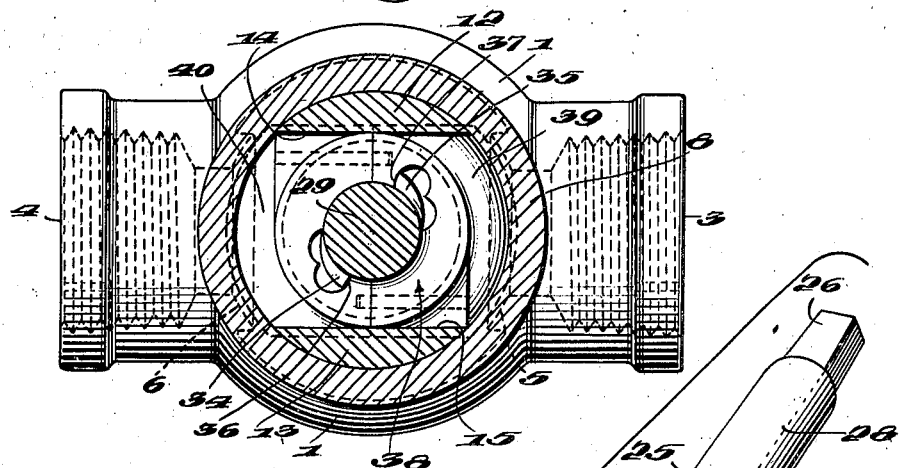
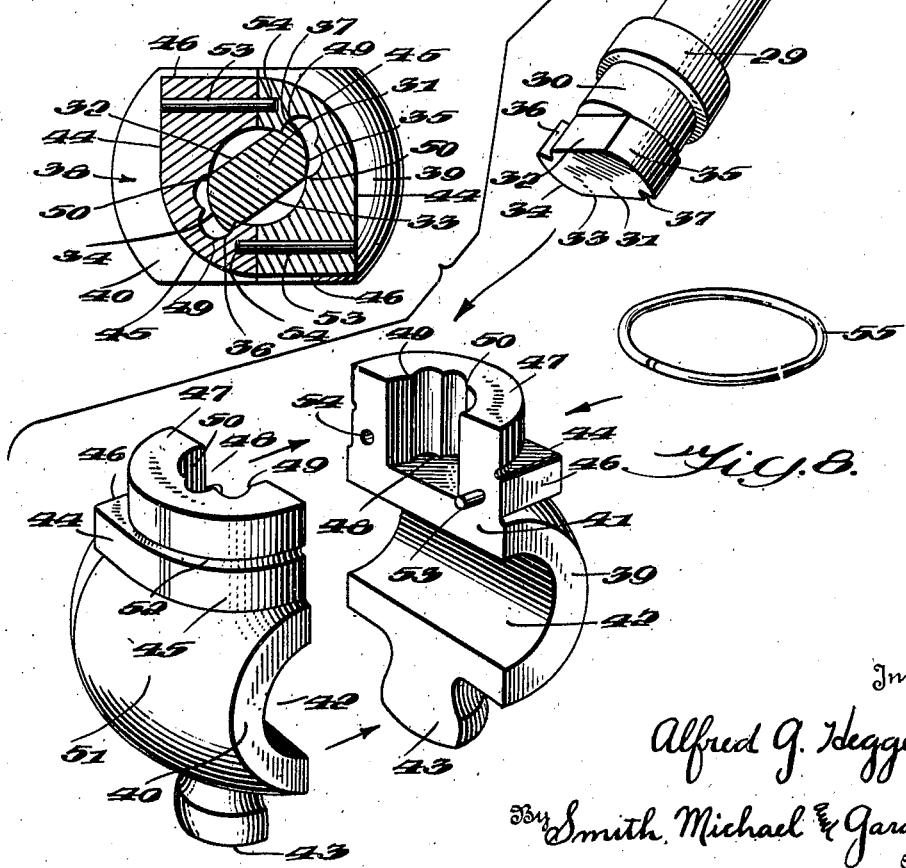
Inventor:
Alfred G. Heggem,
By Smith, Michael & Gardiner,
Attorneys Patented Mar. 31, 1942

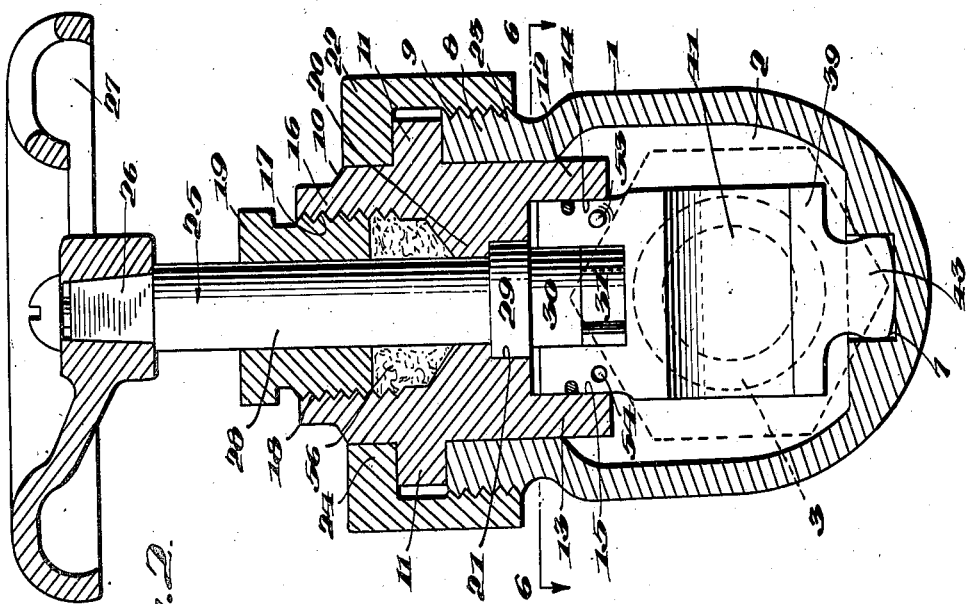
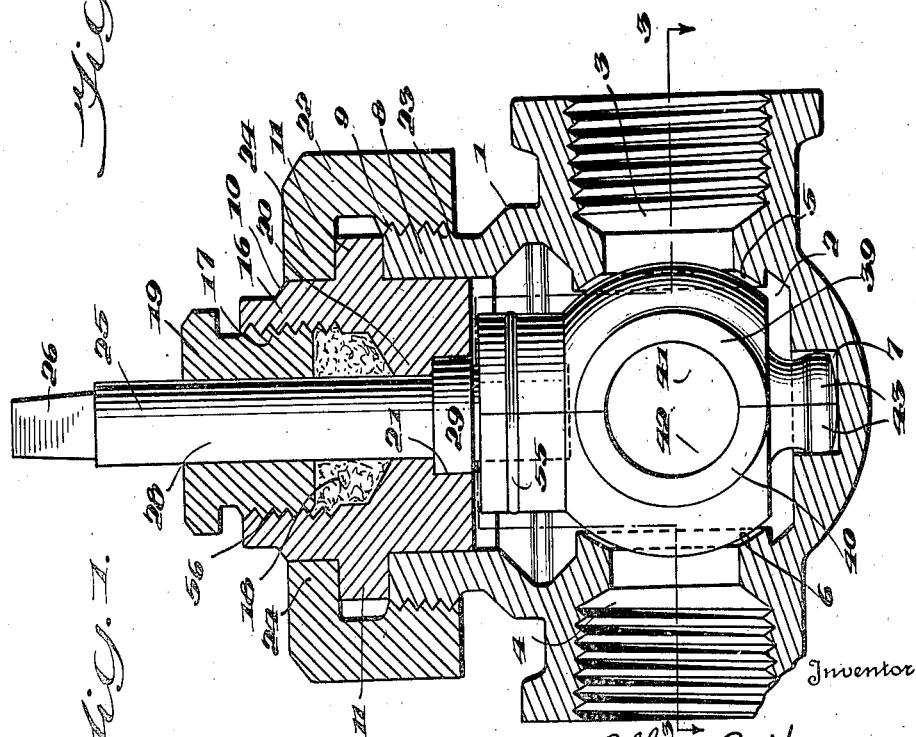

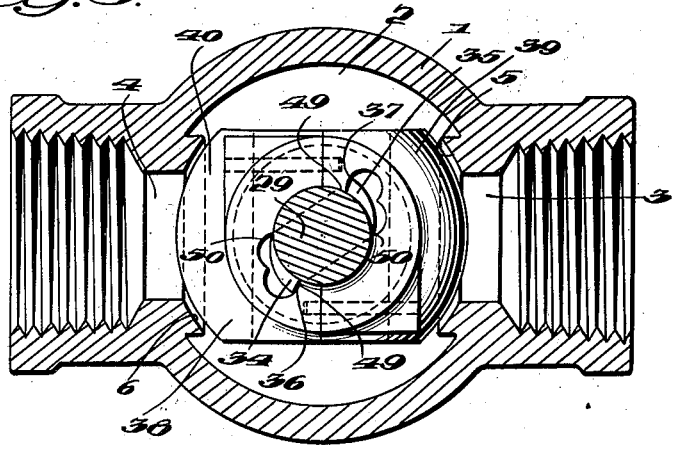
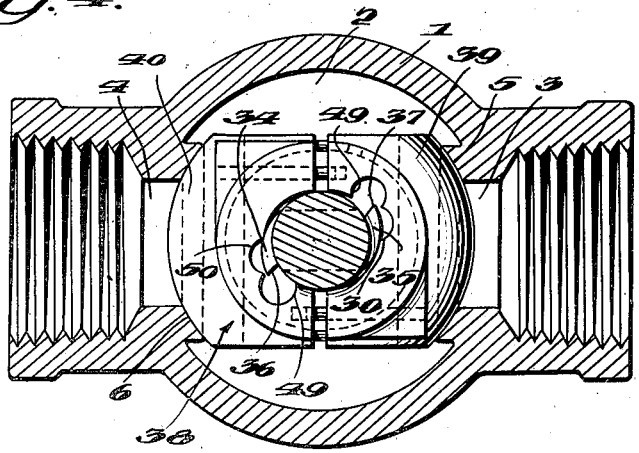
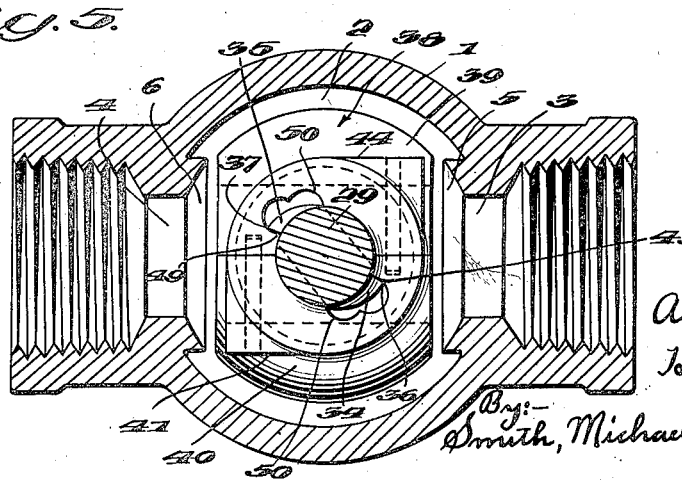

2,277,975

UNITED STATES PATENT OFFICE 2,277,975

VALVE

Alfred G. Heggem, Tulsa, Okla.

Application January 31, 1941, Serial No. 376,881

19 Claims. (Cl. 251—102)

My invention relates to valves, and has particular reference to an improved rotary valve for controlling the flow of fluids operating under relatively high pressures, such as the pressures frequently encountered in oil and gas wells, pipe lines and similar high pressure installations.

There have been granted to me in the past a number of patents relating to valve constructions of the same general type as that involved herein, and comprising a valve body having an inlet opening and an outlet opening, a chamber communicating with said openings, a valve core disposed within the chamber and rotatable with respect thereto, a valve stem rotatable with respect to the valve core and valve body, and means controlled by the rotation of the valve stem for alternately rotating and tilting the valve core. Such constructions are disclosed and claimed, for example, in such patents as 1,989,009 of Jan. 22, 1935; 2,039,220 of April 28, 1936; 2,076,838, 2,076,839, 2,076,840, 2,076,841 all dated April 13, 1937 and 2,200,474 of May 14, 1940. The valve constructions disclosed and claimed in my aforesaid patents are characterized by the fact that the valve core is bodily rotatable as a unit from a position in which its flow passage is aligned with the inlet and outlet passages of the valve body to a position in which the flow passage in the valve core is out of alignment with the inlet and outlet passages, and this rotative movement is followed by a non-rotative movement, tilting or rocking in character, by which a valve face on the valve core is positively moved into firm seating engagement with a valve seat within the valve body adjacent the inner end of one of the passages leading to or from the valve chamber. My present invention differs from the valve constructions disclosed and claimed in my aforesaid patents, in that I now provide a sectional valve core, which is bodily rotatable to move the same to a position in which the flow-restricting surfaces on opposite sides of the sectional valve core are in alignment with valve seats positioned at the inner ends of both the inlet and outlet passages, which rotative movement is followed by a tilting or rocking movement of the sections of the valve core whereby the flow restricting surfaces are positively moved into firm sealing engagement with the valve seats positioned at the inner ends of both the inlet and outlet passages.

It is an object of my present invention to provide a valve including a valve body having inlet and outlet passages communicating with a valve chamber, and a sectional valve core movable within said chamber to open or closed position to effectively control the flow of fluid through the valve.

It is an object of my invention to provide a valve including a sectional, rotatable core member having a passage extending through the sections thereof which passage, when brought into alignment with the inlet and outlet passages of the valve body, permits the flow of fluid through the valve, each of the sections of said core having a flow restricting surface thereon movable into alignment with the passages when the valve core is rotated toward closed position, and each of the sections of said core being tiltable into sealing contact with an adjacent valve seat provided at the inner end of the inlet or outlet passages to thereby effectively seal communication between said passages and to thereby cut off the flow of fluid through the valve.

It is an object of my present invention to provide a sectional, rotatable valve core, the sections of which are simultaneously rotatable and independently and simultaneously tiltable, and to associate with such a valve core a novel operating means actuated by the rotation of the valve handle and valve stem, for sequentially effecting alternate rotation of the sectional valve core and tilting of the sections thereof with respect to their cooperating valve seats.

It is a further object of my invention to provide a novel operating means interposed between the valve handle and the sectional valve core to effectively transmit rotary motion of the handle to the sectional valve core to cause an initial tilting of the sections away from their cooperating valve seats and a subsequent simultaneous rotation of the sections to align the passage through the valve core with the inlet and outlet passages in the valve body as the valve handle is rotated in a direction to open the valve, and, when the valve handle is rotated in the opposite direction to close the valve, to cause initial and simultaneous rotation of the sections to move the passage therethrough out of alignment with the inlet and outlet passages in the valve body and a subsequent tilting of each of the sections to move the flow-restricting surfaces thereon into firm and positive engagement with respect to their cooperating valve seats.

It is a further object of my invention to provide a valve of the above mentioned character and including a valve core comprising two sections each having at the base thereof complementary portions constituting, when the sections are assembled within the valve chamber, a trunnion adapted for insertion within a centrally-located, circular recess formed in the bottom of the valve chamber, said sections having at the tops thereof complementary portions constituting, when the sections are assembled within the valve chamber, a socket having spaced shoulders on the inner surface thereof, and to provide, further, a valve stem having an end portion provided with cam surfaces adapted for insertion within said socket and rotatable therein, in one direction, to positively move the sections together and to cause simultaneous rotation of said sections, and, when rotated in an opposite direction, to effect simultaneous rotation of said sections and to cause the sections to tilt in opposite directions and into sealing contact with adjacent valve seats, the structure including suitable guides and stops for guiding and limiting the rotary and tilting movements of the valve core and valve core sections.

It is a still further object of my invention to provide a valve which is simple in construction and operation, easy to assemble and disassemble, strong and durable, capable of withstanding relatively high pressures, and highly efficient for the purposes for which designed.

In the accompanying drawings forming a part of this specification and wherein, for the purpose of illustration, I have shown a preferred embodiment of my present invention.

Figure 1 is a central, vertical view, partly in section, of a valve embodying the features of my present invention and showing the sectional valve core after it has been rotated toward closed position but before the sections of the valve core have been tilted into sealing contact with the valve seats surrounding the inlet and outlet passages, Fig. 2 is a central, vertical view, partly in section, of the valve shown in Fig. 1, the section being taken at right angles to that of Fig. 1, Figs. 3, 4 and 5 are transverse sectional views on the line 3—3 of Fig. 1 and showing the arrangement of parts when the valve core is in partly closed position, fully closed position, and fully open position, respectively, Fig. 6 is a transverse sectional view on the line 6—6 of Fig. 2, Fig. 7 is a horizontal sectional view through the socket portion of the valve core and the lower cooperating end of the valve stem showing the arrangement of parts when the valve core has been moved into a position intermediate the open and closed positions thereof, and, Fig. 8 is an exploded perspective view of the two sections of the valve core, the valve stem, and a resilient ring member which may, if desired, constitute a part of my present invention.

Referring more particularly to the accompanying drawings wherein like reference numerals have been employed to designate like parts throughout the several views, the numeral 1 indicates the lower section of the valve body, which section includes a closed bottomed, open top valve chamber 2, communicating with laterally extending passages 3 and 4 for the inflow and outflow, respectively, of the fluid or fluids to be controlled by the valve. These passages 3 and 4 are disposed in axial alignment and are preferably threaded to permit the valve to be screwed on to a well casing, pipe or the like, this construction, because of the axial alignment of the inlet and outlet passages and the construction of the preferred form of sectional valve core to be hereinafter described, being admirably suited for use as a well casing valve, where it is frequently desired to operate the bits or other drilling or pumping tools directly through the valve and without the necessity of removing the valve from the casing. The inner ends of the inlet and outlet passages 3 and 4 are provided with machined seats 5 and 6, respectively. The wall defining the bottom of the valve chamber 2 is provided with a centrally-located, circular recess 7 for a purpose to be hereinafter described, and the upper portion of the body section 1 includes an upstanding annular flange 8 provided on its outer surface with threads 9.

The intermediate section 10 of the valve body includes a peripheral flange 11 adapted to rest upon the upper end of the annular flange 8; a pair of depending portions 12 and 13 whose inner, opposed faces 14 and 15 are flat and are arranged in parallel spaced relation as best shown in Figs. 2 and 6 of the accompanying drawings; and an upwardly extending annular flange 16 provided on its inner surface with threads 17 adapted to cooperate with threads 18 on a threaded plug or "follower" 19. It is to be noted that the intermediate section of the valve casing is provided with an axial bore extending through a partition 20 which separates the annular chamber formed by the upwardly extending annular flange 16 from the space below said partition, the upper surface of said partition being sloped or inclined downwardly toward the central bore extending through the said partition, as clearly indicated in Figs. 1 and 2 of the accompanying drawings. The lower surface of the intermediate section of the valve body below the partition 20, is provided with an enlarged countersunk portion 21.

The section 22 of the valve body is provided with internal threads 23 adapted to cooperate with the external threads 9 on the outer surface of the upstanding annular flange 8, and is further provided with an inwardly extending flange 24 adapted to overlie the peripheral flange 11 of the intermediate section 10 of the valve body, the external surface of this section 22 having flattened portions, i. e., being of square, hexagonal, octagonal or of other non-circular cross-section, whereby a wrench or other suitable tool may be employed to screw the section 22 onto the section 1 to rigidly clamp the peripheral flange 11 between the top of the upstanding flange 8 and the bottom or inner surface of the inwardly extending flange 24.

The valve stem of my present invention is designated broadly by the reference character 25, and includes a reduced, non-circular end portion 26 adapted to be engaged by a suitable hand wheel 27, by means of which rotation is imparted to the valve stem; a relatively long, intermediate portion 28 of circular cross-section and of a diameter corresponding substantially to the diameter of the bore through the partition 20; an enlarged portion 29 of circular cross-section and of a diameter corresponding substantially to the diameter of the inner surface of the counter-sunk portion 21; an intermediate portion 30 of annular cross-section corresponding to the diameter of the section 28; and a lower end portion 31 having flat, parallel sides 32 and 33 and cam-shaped sides 34 and 35 which terminate in flat shoulders 36 and 37, respectively.

Adapted for positioning within the valve chamber 2 is a valve core 38 comprising two identical, substantially semi-spherical sections 39 and 40.

As each of these valve core sections are identical, the present specification will be restricted to a detailed description of the structure of one only of said sections. The sections 39 and 40 each include a vertical plane face 41; a semi-cylindrical passage 42; a semi-circular lower extension 43 having its outer surface slightly rounded or curved in a vertical direction; a horizontally extending flange near the top of the section having a plane, straight side surface 44, a plane curved side surface 45 and a plane, straight side surface 46 extending at right angles to the surface 44 at the end of said surface 44 opposite the curved surface 45; an upstanding top flange 47, semi-circular in form, and providing therein a semi-cylindrical recess 48 the radius of which is slightly greater than one-half the length of the side faces 32 or 33 at the lower end of the valve stem, inner surface of the recess 48 being cut away for a portion of the length thereof to provide spaced, vertical shoulders 49 and 50 for a purpose to be hereinafter described; and a curved, outer and imperforate face 51 adapted to engage one of the valve seats 5 or 6 at the inner end of the inlet or outlet passages 3 and 4, respectively, to effect a fluid-tight seal or closure therewith when said face is moved into firm and positive contact with said seat. Each of the sections 39 and 40 may be provided with a semi-annular groove 52 formed in the outer surface of the upstanding top flange 47, preferably above the horizontally extending flange.

When two of the valve core sections 39 and 40 are assembled in the manner suggested by Fig. 8, i. e., with their plane faces 41 in contact, the two semi-circular passages 42 coact to provide a cylindrical passage which extends in axial alignment with and between the inlet and outlet passages 3 and 4 when the valve is in open position, thus providing a straight, uninterrupted passage for the flow of fluid through the valve. The two semi-circular lower extensions 43 coact to provide a trunnion adapted for insertion within the recess 7 in the wall defining the bottom of the valve chamber 2, the slightly rounded or curved outer surfaces of these extensions permitting the sections to tilt or rock to a limited extent within the valve chamber. The two horizontally extending flanges including the flat faces 44 and 46 and the curved face 45, are disposed in the same horizontal plane, with the flat faces 44 disposed in parallel, spaced relation and with the overall distance between said faces corresponding substantially to the distance between the flat faces 14 and 15 on the depending portions 12 and 13, respectively, of the intermediate section 10 of the valve body. The two upstanding top flanges 47 cooperate, when the sections 39 and 40 are assembled as described, to provide a socket including in the inner walls thereof the spaced, vertical shoulders 49 and 50, respective pairs of which are disposed at opposite sides of the socket. If desired, dowel pins 53 may be partially inserted within bores or recesses opening on the flat face 41 of each valve core section at one side thereof, the extended portion of each pin adapted to slidably engage within a cooperating bore or recess 54 opening on the flat face 41 at the side thereof opposite the inserted pin 53. When the sections 39 and 40 are assembled as above described, the projecting portion of the pin 53 of one section will slidably engage within the bore or recess 54 of the other section to assist in guiding the sections as said sections are moved, to a limited extent, toward and from each other.

In order to resiliently retain the sections 39 and 40 in assembled relation and to assist in the operation of the sectional core in a manner to be hereinafter more fully described, I may, after the sections 39 and 40 are assembled, apply a split metal ring 55 to the upstanding flange sections 47 to repose in the annular groove 52. It is to be noted that the maximum overall length of the valve core sections 39 and 40 is in a direction parallel to the axis of the passage through the valve core. This maximum overall length is less than the internal diameter of the upstanding flange 16 and, hence, it will be obvious that the sectional valve core may be inserted within, and removed from, the chamber 2 through the upper end of the section 1 of the valve body.

Referring now to the manner of assembling the various component parts described in the preceding paragraphs, the first step of such assembly consists in placing the two plane faces 41 of the sections 39 and 40 together, i. e., in surface contact, with the extensions of the dowel pins 53 slidably engaged within the aligned recesses 54 in the opposite valve core section. When thus assembled, the split metal ring 55 may, if desired, be snapped into the annular grooves 52 to resiliently retain the sections together. The sectional valve core, when thus assembled, is inserted within the valve chamber 2 and the trunnion sections 43 disposed in the recess 7 and with the passage through the valve core aligned with the passages 3 and 4 as shown in Fig. 5 of the accompanying drawings. The valve stem 25 is then inserted through the opening in the partition 20 in the intermediate section 10 by passing the end 26 of said stem upwardly through said opening and moving the stem until the cylindrical portion 29 of the stem is disposed within the countersunk portion 21 immediately below said partition. Packing material 56 is then inserted within the chamber above the partition 20 and the threaded plug or "follower" 19 is screwed down to compress said packing material into fluid-tight contact with the cylindrical portion 28 of the valve stem. The intermediate section 10 through which the valve stem 25 has been inserted, is then superimposed upon the body section 1 with the peripheral flange 11 resting upon the upper end of the upstanding annular flange 8 and with the lower end portion 31 of the valve stem disposed within the recess or socket 48, with the cam-shaped sides 34 and 35 disposed between the spaced vertical shoulders 49 and 50 formed on the inner surface of the upstanding flange 47 of each section 39 and 40. The flat, parallel faces 14 and 15 on the depending portions 12 and 13, respectively, of intermediate section 10 (see Figs. 2 and 6) are disposed in parallel relation on opposite sides of a center line passing through the inlet and outlet passages 3 and 4, respectively. The section 22 is then screwed onto the upstanding threaded flange 8, the engagement between the flange 11 and the inturned flange 24, rigidly securing the parts in assembled relation. A valve wheel or handle 27 is then secured to the non-circular portion 26 of the valve stem.

Referring now to the operation of the valve and valve actuating mechanism described in detail above, and assuming that, when assembled, the valve is in open position as illustrated in Fig. 5, it will be noted that when in this position, the straight side surface 44 of the section 39 and the straight side surface 44 of the section 40 are in engagement with the adjacent flat faces 14 and 15, respectively, formed on the depending portions 12 and 13, respectively, of the intermediate section 10. When this condition exists, the two sections 39 and 40 are held rigidly together. Rotation of the valve stem in a clockwise direction as viewed in Fig. 5 will cause simultaneous rotation of the sections 39 and 40 in a clockwise direction, it being understood that curved faces 45 on the sections 39 and 40 will slidably engage the flat faces 14 and 15 during such movement. When the valve stem and valve sections have been rotated through a quarter of a revolution, the straight side surfaces 46 of the section 39 and the straight side surface 46 of the section 40 contact, respectively, with the flat faces 15 and 14, (see Fig. 6) and, hence, further rotation of the sections is prevented. When this occurs, the parts are in the positions illustrated in Fig. 3, i. e., the imperforate faces 51 of the sections 39 and 40 are disposed in aligned, spaced relation with respect to the adjacent valve seats 5 and 6, respectively. Continued rotation of the valve stem in a clockwise direction can no longer effect clockwise rotation of the sections of the valve core because of the engagement between the side surfaces 46 and the flat faces 14 and 15, but such further rotation of the valve stem causes the cam surfaces 34 and 35 to rotate within the socket formed by the complementary sections 47 and, due to the shape of the cam and its relationship to the vertical shoulders 50, this rotation of the cam 31 within the socket causes the cams 34 and 35 to positively tilt the two sections 39 and 40 apart to move the imperforate flow-restricting surfaces 51 into tight sealing contact with the adjacent valve seats, whereupon the valve is fully closed and the component parts thereof assume the position shown in Fig. 4, it being noted that as the sections 39 and 40 are moved from the position shown in Fig. 3 to the position shown in Fig. 4, the contact between the straight, flat surfaces 46 and the straight, flat surfaces 14 and 15 guides the sections to insure proper movement toward, and proper contact between, the imperforate flow-restricting surfaces 51 and their cooperating valve seats, which movement and contact is further insured by the dowel pins 53 sliding within their cooperating recesses 54.

When it is desired to open the valve to permit the flow of fluid therethrough, i. e., when it is desired to move the valve from the closed position shown in Fig. 4 to the open position shown in Fig. 5, a counterclockwise rotation is imparted to the valve stem. During the initial rotation of the valve stem in a counterclockwise direction, the cams 34 and 35 rotate within the recess formed by the complementary sections 47 until such time as the shoulders 36 and 37 are brought into engagement with the shoulders 49. Continued counterclockwise rotation of the valve stem serves to tilt the valve core sections 39 and 40 into contact with each other and, hence, moves the flow-restricting surfaces 51 of said sections out of contact with their cooperating valve seats, so that the parts thus assume the positions shown in Fig. 3, it being noted that as the sections 39 and 40 are moved from the position shown in Fig. 4 to the position shown in Fig. 3, the contact between the straight, flat surface 46 on each section and the straight, flat surfaces 14 and 15, guides the sections to insure proper, straight-line movement thereof, which movement is further insured by the dowel pins 53 sliding within their cooperating recesses 54.

Continued counterclockwise rotation of the valve stem will cause counterclockwise rotation of the valve core, due to the engagement between the shoulders 36 and 37 and the shoulders 49, which rotation will continue for a quarter of a turn, i. e., until the straight, flat surfaces 44 contact the straight, flat surfaces 14 and 15, whereupon the valve is fully opened and the component parts thereof again assume the positions shown in Fig. 5, with the flow passage formed by the complementary semi-annular recesses 42 in alignment with the inlet and outlet passages 3 and 4 of the valve body.

It will be apparent that during the rotative movement of the valve core section, i. e., when the composite valve core is rotating from the position shown in Fig. 3 to the position shown in Fig. 5, or vice versa, the two sections 39 and 40 are held together by the engagement between the curved, flat surfaces 45 on each section and the straight, flat surfaces 14 and 15. Hence the use of the metal ring 55 is optional, as it is not necessary, for the proper operation of the valve, that such a ring be provided to urge the sections together or to maintain the sections together during their rotative movements. It will also be apparent that the straight, flat surfaces 14 and 15 act as stops or abutments for the straight, flat surfaces 44 and 46 and that when either of said surfaces 44 or 46 contact the said surfaces 14 and 15, further rotation of the composite valve core is arrested. The straight, flat surfaces 14 and 15 also act as guide surfaces, it being noted that when the sections of the valve core are tilted apart, i. e., when said sections are moved from the position shown in Fig. 3 to the position shown in Fig. 4, or vice versa, the sliding engagement between the straight, flat surface 46 on each section and the straight, flat surfaces 14 and 15 confines the tilting of the sections to a straight-line movement into and out of contact with their adjacent valve seats. Hence the use of the dowel pins 53 is optional, as it is not necessary, for the proper operation of the valve, that such pins be provided.

It will be noted from the above description of construction and operation that throughout the entire cycle of operation of the valve, the movements of the valve stem and the valve core are so timed that they occur at relatively fixed positions. This is an important feature of my present invention, as it permits the opening and closing movements to be reversed at any stage without interfering with the effective functioning of the several parts. The valve and valve actuating mechanism of my present invention are notable for their extreme simplicity of construction and operation, it being noted that there are but relatively few moving parts and that all of such parts are of strong and sturdy construction.

While I have elected to describe my present invention as a valve for controlling the flow of fluids operating under relatively high pressures, it is to be understood that the valve is capable of use for controlling the flow of any liquid or gas, regardless of the pressure thereof. It is to be further understood that the form of my invention shown and described herein is to be taken as a preferred embodiment of the same and that various changes may be made in the size, shape and arrangement of parts without departing from the spirit of my invention or the scope of the subjoined claims.

Having thus described my invention what I claim as new and desire to secure by Letters Patent is:

1. A valve including a valve body having an inlet and an outlet opening and a valve chamber communicating with said openings; valve seats surrounding said openings; a rotatable, sectional valve core disposed within said chamber and journalled at its lower end in said valve body, said valve core being split in a plane passing through its axis of rotation; a valve stem extending into said chamber and cooperating with the upper end of said valve core; and means actuated solely by the rotation of said valve stem for sequentially rotating said valve core and separating the upper ends of said sections to tilt said sections angularly with respect to the axis of rotation of said valve core into sealing engagement with said seats.

2. A valve including a valve body having an inlet and an outlet opening and a valve chamber communicating with said openings; valve seats surrounding said openings; a rotatable, sectional valve core disposed within said chamber and journalled at its lower end in said valve body, said valve core being split in a plane passing through its axis of rotation; a valve stem extending into said chamber and cooperating with the upper end of said valve core to effect simultaneous rotation of the sections of said valve core about its axis of rotation, said stem being capable of rotation independently of said valve core; and means actuated solely by the rotation of said valve stem for separating the upper ends of said sections angularly with respect to the axis of rotation of said valve core when said valve stem is rotated independently of the rotation of said sectional valve core, said separation of the upper ends of said valve core tilting said sections into sealing engagement with said seats.

3. A valve including a valve body having spaced inlet and outlet openings and a valve chamber communicating with said openings; valve seats surrounding said spaced inlet and outlet openings; a rotatable, sectional valve core disposed within said chamber and journalled at its lower end in said valve body, said valve core being split in a plane passing through its axis of rotation and having a flow passage extending therethrough for alignment with the inlet and outlet openings when the valve is open, each of the sections of said valve core having an imperforate flow-restricting surface thereon adapted to be moved into engagement with one of the valve seats when the valve is to be closed; a valve stem extending into said chamber and cooperating with the upper end of said valve core, said stem being rotatable with respect to said sectional valve core and valve body; and means actuated by the rotation of said valve stem for sequentially rotating said valve core and separating the upper ends of the said sections to tilt said sections angularly with respect to the axis of rotation of said valve core and to thus move the imperforate flow-restricting surfaces on said sections into sealing engagement with said valve seats.

4. A valve including a valve body having an inlet and an outlet opening and a valve chamber communicating with said openings; valve seats surrounding said openings; a rotatable, sectional valve core disposed within said chamber and journalled at its lower end in said valve body, said valve core being split in a plane passing through its axis of rotation; a valve stem extending into said chamber and cooperating with the upper end of said valve core and rotatable with respect to said valve core and said valve body; a cam at the lower end of said valve stem engaging the upper ends of said sections and including surfaces for effecting rotation of said valve core and surfaces for separating the upper ends of said sections to tilt said sections angularly with respect to the axis of rotation of said valve core into sealing engagement with said seats; and means for rotating said valve stem.

5. A valve including a valve body having an inlet and an outlet opening and a valve chamber communicating with said openings; and means for controlling the flow of fluid through said openings, said means including a rotatable, sectional valve core disposed within said chamber and journalled at its lower end in said valve body, said valve core being split in a plane passing through its axis of rotation, a valve stem extending into said chamber for rotating said sectional valve core, a cam and socket connection between said valve core and said valve stem, the socket portion of said connection being on the valve core and having spaced shoulders on the inner wall thereof, one associated with each of the valve core sections, the cam portion of said connection being on the valve stem and including surfaces adapted to engage said shoulders to effect simultaneous rotation of said valve core sections upon rotation of said valve stem and surfaces for engaging said socket to separate the upper ends of said sections to thus tilt said sections angularly with respect to the axis of rotation of said valve core, and means for rotating said valve stem.

6. A valve including a valve body having an inlet and an outlet opening and a valve chamber communicating with said openings, and means for controlling the flow of fluid through said openings, said means including a sectional valve core disposed within said chamber and journalled in the base of said chamber, each of the sections of said valve core having a semi-circular recess at the top thereof, which recesses cooperate to form a socket at the top of the sectional valve core, a valve stem extending into said chamber and rotatable with respect to said sectional valve core and valve body, and a cam carried by said valve stem and disposed within said socket for alternately rotating the sectional valve core and tilting the sections thereof.

7. A valve including a valve body having an inlet and an outlet opening and a valve chamber communicating with said openings, and means for controlling the flow of fluid through said openings, said means including a sectional valve core disposed within said chamber and journalled in the base of said chamber, each of the sections of said valve core having a semi-circular recess at the top thereof, the inner wall of each recess having a vertical shoulder thereon and said recesses cooperating to form a socket at the top of the sectional valve core, a valve stem extending into said chamber and rotatable with respect to said sectional valve core and valve body, and a cam carried by said valve stem and disposed within said socket, said cam including a surface adapted to engage the vertical shoulder in the wall of each recess to effect simultaneous rotation of said valve core sections upon rotation of said valve stem and a surface adapted to engage the wall of each recess to tilt the sections of the valve core angularly with respect to the axis of said valve stem upon further rotation of said valve stem.

8. A valve including a valve body having an inlet and an outlet opening and a valve chamber communicating with said openings, and means for controlling the flow of fluid through said openings, said means including a sectional valve core disposed within said chamber and journalled in the base thereof, each of the sections having at its lower end a semi-cylindrical depending portion, which portions cooperate to form a trunnion, and each of said sections having a semi-circular recess at the top thereof, which recesses cooperate to form a socket at the top of the sectional valve core, the inner wall of each recess having a vertical shoulder therein, a valve stem extending into said chamber and rotatable with respect to said sectional valve core and valve body, and a cam carried by said valve stem and disposed within said socket, said cam including opposed end portions each having a vertical shoulder and a curved surface thereon, said shoulders on said cam adapted to engage said shoulders on said socket to effect simultaneous rotation of said valve core sections upon rotation of said valve stem, and the curved surfaces on opposed end portions of said cam adapted to engage the wall of each recess to tilt the sections of the valve core angularly with respect to the axis of said valve stem and about the trunnion in the base of the chamber upon further rotation of said valve stem.

9. A valve including a valve body having an inlet and an outlet opening and a valve chamber communicating with said openings, and means for controlling the flow of fluid through said openings, said means including a sectional valve core disposed within said chamber and journalled in the base thereof, each of the sections of said valve core having a semi-circular recess at the top thereof, which recesses cooperate to form a socket at the top of the sectional valve core, the inner wall of each recess being cut away for a portion of the length thereof to define spaced, vertical shoulders therein, a valve stem extending into said chamber and rotatable with respect to said sectional valve core and valve body, and a cam carried by said valve stem and disposed within said socket, said cam including opposed end portions each having a vertical shoulder and a curved cam surface thereon, one of said shoulders on said cam adapted to engage one of the shoulders on the inner wall of one of said recesses to effect simultaneous rotation of said valve core sections upon rotation of said valve stem, and one of said curved cam surfaces adapted to engage the other of said shoulders on the inner wall of one of said recesses to tilt the sections of the valve core angularly with respect to the axis of said valve stem upon further rotation of said valve stem.

10. A valve including a valve body having an inlet and an outlet opening and a valve chamber communicating with said openings; valve seats surrounding said openings; a valve stem extending into said chamber and rotatable with respect to said valve body; a rotatable, sectional valve core disposed within said chamber and cooperating at its upper end with said valve stem and journalled at its lower end in said valve body, said valve core being rotatable simultaneously with said valve stem and being split in a plane passing through its axis of rotation, said valve stem also being rotatable independently of said valve core; stops on said valve body and engageable by portions of said valve core to arrest simultaneous rotation of said valve stem and sectional valve core; means for rotating said valve stem; and means actuated solely by rotation of said valve stem for sequentially rotating said valve core and separating the upper ends of said sections to tilt said sections angularly with respect to the axis of rotation of said valve core and into sealing engagement with said seats when simultaneous rotation of said valve stem and valve core has been arrested.

11. A valve including a valve body having an inlet and an outlet opening and a valve chamber communicating with said openings; valve seats surrounding said openings; a valve stem extending into said chamber and rotatable with respect to said valve body; a rotatable, sectional valve core disposed within said chamber and cooperating at its upper end with said valve stem and journalled at its lower end in said valve body, said valve core being rotatable simultaneously with said valve stem and being split in a plane passing through its axis of rotation, said core having a flange thereon, said valve stem also being rotatable independently of said valve core; an abutment within said valve chamber engageable by the flange on the valve core for arresting simultaneous rotation of said valve stem and sectional valve core; means for rotating said valve stem; and means actuated solely by rotation of said valve stem for sequentially rotating said core and separating the upper ends of said sections to tilt said sections angularly with respect to the axis of rotation of said valve core and into sealing engagement with said seats when simultaneous rotation of said valve stem and valve core has been arrested.

12. A valve including a valve body having an inlet and an outlet opening and a valve chamber communicating with said openings; valve seats surrounding said openings; a valve stem extending into said chamber and rotatable with respect to said valve body; a rotatable, sectional valve core disposed within said chamber and cooperating at its upper end with said valve stem and journalled at its lower end in said valve body, said valve core being rotatable simultaneously with said valve stem and being split in a plane passing through its axis of rotation, said core having a straight, flat surface thereon, said valve stem also being rotatable independently of said valve core; a straight, flat surface within said valve chamber engageable by the straight, flat surface on the valve core to arrest simultaneous rotation of said valve stem and sectional valve core; means for rotating said valve stem; and means actuated solely by rotation of said valve stem for sequentially rotating said core and separating the upper ends of said sections to tilt said sections angularly with respect to the axis of rotation of said valve core and into sealing engagement with said seats when simultaneous rotation of said valve stem and valve core has been arrested.

13. A valve including a valve body having inlet and outlet openings disposed in axial alignment and having a valve chamber disposed between said openings and in communication therewith, said chamber having a straight, flat surface thereon extending parallel to the axis of said aligned inlet and outlet openings; valve seats surrounding said openings; a valve stem extending into said chamber and rotatable with respect to said valve body; a rotatable, sectional valve core disposed within said chamber and cooperating at its upper end with said valve stem and journalled at its lower end in said valve body, said valve core being rotatable simultaneously with said valve stem and being split in a plane passing through its axis of rotation, said core having a straight, flat surface thereon normal to the plane in which said valve core is split, which surface contacts the straight, flat surface in the chamber for arresting simultaneous rotation of said valve stem and sectional valve core, said valve stem also being rotatable independently of said valve core; means for rotating said valve stem; and means actuated solely by the rotation of said valve stem for sequentially rotating said core and separating the upper ends of said sections to tilt said sections in opposite directions in a plane parallel to the axis of said aligned outlet and inlet openings and into sealing engagement with said seats when simultaneous rotation of said valve stem and valve core has been arrested.

14. A valve including a valve body having spaced inlet and outlet openings therein and a chamber communicating with said openings; valve seats surrounding said openings; a sectional valve core disposed within said chamber and journalled at its lower end in said valve body, said valve core being split in a plane passing through its axis of rotation, the sections of said valve core being simultaneously rotatable and independently tiltable within said chamber; means cooperating with the upper end of said valve core for sequentially and alternately rotating and tilting said sections; and means for guiding said sections during tilting movements thereof into sealing engagement with said seats.

15. A valve including a valve body having spaced inlet and outlet openings therein and a chamber communicating with said openings; valve seats surrounding said openings; a straight, flat surface within said valve chamber and extending in a direction between said valve seats; a sectional valve core disposed within said chamber and journalled at its lower end in said valve body, said valve core being split in a plane passing through its axis of rotation, the sections of said valve core being simultaneously rotatable and independently tiltable within said chamber; means cooperating with the upper end of said valve core for sequentially and alternately rotating and tilting said sections; and a straight, flat surface on said valve core normal to the plane in which said valve core is split which surface contacts the straight, flat surface within said chamber and slidably engages the same for guiding said sections during tilting movements thereof into sealing engagement with said seats.

16. A valve including a valve body having aligned inlet and outlet openings therein and a chamber communicating with said openings; valve seats surrounding said openings; straight, flat guide surfaces disposed within said chamber at opposite sides of the axis of said inlet and outlet openings and parallel to said axis; a sectional valve core disposed within said chamber and journalled at its lower end in said valve body, said valve core being split in a plane passing through its axis of rotation, the sections of said valve core being simultaneously rotatable and independently tiltable within said chamber; a straight, flat surface on each section of said valve core normal to the plane in which said valve core is split, which surface is adapted to engage one of the straight, flat surfaces in said valve chamber to arrest rotation of said valve core; and means cooperating with the upper end of said valve core for sequentially and alternately rotating and tilting said sections, the engagement between said flat surfaces in said valve chamber and on said valve core sections guiding said sections during the tilting movements thereof into sealing engagement with said seats.

17. A valve including a valve body having aligned inlet and outlet openings therein and a chamber communicating with said openings; valve seats surrounding said openings; straight, flat guide surfaces disposed within said chamber at opposite sides of the axis of said inlet and outlet openings and parallel to said axis, a sectional valve core disposed within said chamber and journalled at its lower end in said valve body, said valve core being split in a plane passing through its axis of rotation, the sections of said valve core being simultaneously rotatable and independently tiltable within said chamber, each section of said valve core having thereon a pair of straight, flat surfaces disposed at right angles to each other, one surface being parallel to the plane in which said valve core is split and the other of said surfaces being normal to said plane, the flat surfaces on each section adapted to alternately engage the flat surfaces in the valve chamber upon completion of the rotative movement of the valve core to arrest rotation of said valve core; and means cooperating with the upper end of said valve core for sequentially and alternately rotating and tilting said sections, the engagement between said flat surfaces in said valve chamber and said flat surfaces on said valve core sections which are normal to the plane in which said valve core is split serving to guide said sections during the tilting movements thereof into sealing engagement with said seats.

18. A valve including a valve body having inlet and outlet openings disposed in axial alignment and having a valve chamber disposed between said openings and in communication therewith, said chamber having a straight, flat surface therein extending parallel to the axis of said aligned inlet and outlet openings; valve seats surrounding said openings; a valve stem extending into said chamber and rotatable with respect to said valve body; a rotatable, sectional valve core disposed within said chamber and cooperating at its upper end with said valve stem and journalled at its lower end in said valve body, said valve core being rotatable simultaneously with said valve stem and being split in a plane passing through its axis of rotation, said core having a straight passage therethrough for alignment with the inlet and outlet openings when said valve core is in open position and each section of said core having an imperforate, flow-restricting surface for engaging the valve seats to close the openings when the valve is in closed position, said core having a straight, flat surface thereon normal to the plane in which said core is split, which surface contacts the straight, flat surface in the chamber when the said imperforate flow-restricting surfaces are moved into alignment with the valve seats surrounding said inlet and outlet openings, said valve stem also being rotatable independently of said valve core; means for rotating said valve stem; and means actuated solely by the independent rotation of said valve stem for separating the upper ends of said sections to tilt said sections in opposite directions in a plane parallel to the axis of the said aligned inlet and outlet openings and into sealing engagement with said seats when the said imperforate flow-restricting surfaces on the core sections are in alignment with the valve seats surrounding said inlet and outlet openings; the engagement between the said straight, flat surfaces serving to guide said sections during the tilting thereof.

19. A valve including a valve body having inlet and outlet openings disposed in axial alignment and having a valve chamber disposed between said openings and in communication therewith, said chamber having a pair of straight, flat surfaces therein extending parallel to the axis of said aligned inlet and outlet openings and disposed on opposite sides of said axis; valve seats surrounding said openings; a valve stem extending into said chamber and rotatable with respect to said valve body; a rotatable, sectional valve core disposed within said chamber and cooperating at its upper end with said valve stem and journalled at its lower end in said valve body, said valve core being rotatable simultaneously with said valve stem and being split in a plane passing through its axis of rotation, each section of said core having a flange thereon provided with a pair of straight, flat surfaces, one surface being parallel to the plane in which said valve core is split and the other of said surfaces being normal to said plane, said surfaces adapted to engage one of the straight, flat surfaces on opposite sides of the axis of the inlet and outlet openings to arrest rotation of said valve sections, said valve stem also being rotatable independently of said valve core, means for rotating said valve stem; and means actuated solely by the independent rotation of said valve stem for separating the upper ends of said sections to tilt said sections in opposite directions in a plane parallel to the axis of the said aligned inlet and outlet openings and into engagement with said seats when the straight, flat surfaces on the sections of the valve core which are normal to the plane in which said valve core is split are in engagement with the straight, flat surfaces on opposite sides of the axis of the aligned inlet and outlet openings, the engagement between said straight, flat surfaces serving to guide said sections during the tilting thereof into sealing engagement with said seats.

ALFRED G. HEGGEM.